(12) United States Patent
Yasuda et al.

(10) Patent No.: US 7,055,322 B2
(45) Date of Patent: Jun. 6, 2006

(54) MASTER CYLINDER

(75) Inventors: Atsushi Yasuda, Kariya (JP); Hideaki Iijima, Kariya (JP); Toshiharu Okuda, Kariya (JP); Kaoru Tsubouchi, Kariya (JP); Katsuhiro Mita, Kariya (JP); Koji Suzuki, Kariya (JP)

(73) Assignee: Advics Co., Ltd., Kariya (JP)

( * ) Notice: Subject to any disclaimer, the term of this patent is extended or adjusted under 35 U.S.C. 154(b) by 0 days.

(21) Appl. No.: 10/958,328

(22) Filed: Oct. 6, 2004

(65) Prior Publication Data

US 2005/0103010 A1    May 19, 2005

(30) Foreign Application Priority Data

Oct. 8, 2003  (JP) ............................. 2003-349710
Feb. 27, 2004 (JP) ............................. 2004-54559

(51) Int. Cl.
*B60T 11/20* (2006.01)

(52) U.S. Cl. ........................................ 60/588
(58) Field of Classification Search ................ 60/585, 60/586, 588
See application file for complete search history.

(56) References Cited

U.S. PATENT DOCUMENTS

| 5,953,916 A | 9/1999 | Wurl et al. |
| 6,272,858 B1 | 8/2001 | Takano et al. |
| 2005/0016174 A1* | 1/2005 | Tsubouchi et al. ............ 60/588 |
| 2005/0172626 A1* | 8/2005 | Lebret et al. .................. 60/533 |

FOREIGN PATENT DOCUMENTS

| FR | 2827244 A1 * | 1/2003 |
| JP | 11-512681 | 11/1999 |
| JP | 2000-108878 | 4/2000 |
| JP | 2001-146157 | 5/2001 |
| JP | 2003-170824 | 6/2003 |
| JP | 2004-521025 | 7/2004 |
| WO | WO 03/006284 A3 | 1/2003 |

* cited by examiner

*Primary Examiner*—Thomas E. Lazo
(74) *Attorney, Agent, or Firm*—Buchanan Ingersoll PC

(57) ABSTRACT

A master cylinder includes a primary piston and a secondary piston, each formed with piston ports which include two different kinds of ports, i.e. first ports for ensuring communication between a reservoir and a pressure chamber of the master cylinder, and second ports through which brake fluid is sucked from the reservoir during automatic break control. The second ports are greater in number than the first ports and are positioned forwardly of the first ports so that the second ports are closed by primary cups which are provided on the inner wall of the cylinder body so as to be in sliding contact with the respective pistons before the first ports when the respective pistons are advanced. An annular wall having a greater inner diameter than the outer diameter of the pistons is formed on the inner wall of the cylinder body to support the back of each of the primary cups. An annular groove is formed in each piston so as to communicate with the first ports. The annular groove is preferably arranged so as to radially oppose the annular wall when the piston is in an inoperative position.

7 Claims, 6 Drawing Sheets

MASTER CYLINDER

BACKGROUND OF THE INVENTION

The present invention relates to a plunger type master cylinder used in a vehicle hydraulic brake system, and particularly a master cylinder which ensures smooth inline suction of brake fluid during automatic brake control and which suppresses invalid stroke of the brake pedal at an initial stage.

As used herein, a plunger type master cylinder refers to a master cylinder including a piston which is in sliding contact with the inner peripheral surfaces of cups held on a cylinder body to pressurize brake fluid in a pressure chamber defined in the cylinder body.

Many modern vehicle hydraulic brake systems have various sophisticated functions including automatic brake control functions, which are initiated by electronic control units while the brake pedal is not being depressed, such automatic brake control functions including traction control (TRC) and electronic vehicle stability control (ESC).

Some of the vehicle hydraulic brake systems having an automatic brake control function are designed so as to suck brake fluid required during automatic braking from a reservoir through its master cylinder. Conventional master cylinders used in this type of vehicle hydraulic brake systems are disclosed in JP patent publications 11-512681 (Publication 1), 2000-108878 (Publication 2) and 2003-170824 (Publication 3).

In Publication 1, the piston of the master cylinder is formed with circumferentially elongated piston ports through which the pressure chamber communicates with the reservoir while the brake pedal is not being depressed. Since the piston ports are circumferentially elongated, its sectional area (passage area) is large, so that when required by hydraulic units, brake fluid can be smoothly supplied through the piston ports. But since the piston ports have a large sectional area, when the brake pedal is depressed, it tends to be pushed in with an extremely light force until the piston ports are completely closed by the primary cup. This will give the driver an uncomfortable feeling as if the brakes are not working at all.

Publication 1 is completely silent about this problem. One solution to this problem would be to reduce the sectional area of the piston ports. But this solution would impair smooth suction of brake fluid through the piston ports.

In Publication 2, the piston is formed with piston ports (relief ports) each having one end thereof open to the outer periphery of the piston and the other end open to the pressure chamber. The piston is further formed with a groove on its outer periphery through which the one end of each piston port is open to the outer periphery of the piston. The groove has a control tapered surface provided rearwardly of the piston ports in order to increase the surface pressure at the contact surfaces of the cup and the piston, and therefore, the groove has a width greater than the diameter of the piston ports. In this arrangement, the piston ports are supposed to be closed by the cup when the rear ends of the piston ports align with the rear end of the radially inner portion of the cup. But actually, since the moderately sloping tapered surface of the groove is provided rearwardly of the piston ports, the piston ports tend to be closed when the rear ends of the radially inner portion of the cup reaches an indeterminate point of the tapered surface. Thus, the position of the piston where the piston ports are closed by the cup cannot be determined accurately.

Moreover, because the depth of the groove having the control tapered surface is limited for sufficient interference of the cup, and because the radially inner portion of the cup tends to be pulled into the groove while the piston is not being operated, the effective sectional area of the passage through which brake fluid flows scarcely increases.

Publication 3 discloses a plunger type master cylinder having a piston formed with a plurality of piston ports and an annular groove through which the piston ports communicate with the reservoir. In this arrangement, since the annular groove has a width smaller than the diameter of the piston ports, brake fluid cannot sufficiently smoothly flow through the annular groove. Thus, if this master cylinder is used in a hydraulic brake system in which high suction rate is required during automatic braking, brake fluid cannot be supplied at a sufficiently high rate. This deteriorates brake response.

Another conventional master cylinder includes a valve mechanism for reducing the sectional area of the piston ports or any other passage through which the pressure chamber communicates with the reservoir when the brake pedal is depressed. Such a valve mechanism is however not preferable because it will complicate the structure and push up the cost.

An object of the invention is to provide a master cylinder of the above type which ensures smooth suction of brake fluid during automatic brake control and which suppresses an initial invalid stroke of the brake pedal.

SUMMARY OF THE INVENTION

According to this invention, there is provided a master cylinder comprising a cylinder body, a cup supported on an inner wall of the cylinder body, and a piston inserted in the cylinder body so as to be in sliding contact with a radially inner periphery of the cup, the piston defining a pressure chamber in the cylinder body, and being formed with piston ports through which the pressure chamber is adapted to communicate with a reservoir while the piston is in an inoperative position, the piston ports comprising first ports for ensuring communication between the pressure chamber and the reservoir, and second ports through which brake fluid in the reservoir is sucked into the pressure chamber during automatic brake control, the second ports being greater in number than the first ports and provided forwardly of the first ports with respect to a direction in which the piston advances.

Preferably, the first ports overlap with the second ports as viewed from a direction perpendicular to an axis of the piston.

Irrespective of whether or not the first ports overlap with the second ports, there are preferably provided 1 to 2 of the first ports and 10–14 of the second ports.

With this arrangement, when the piston is in its inoperative position, brake fluid can be supplied through both of the first and second piston ports. Thus, brake fluid can be sucked smoothly during automatic brake control.

When the brake pedal is depressed, the second ports, which are positioned forwardly of the first ports, are closed first. Since the second ports are greater in number and thus greater in sectional area, as soon as the second ports are closed, the pressure in the pressure chamber begins to rise quickly, so that the driver feels the braking effect quickly.

Thus, it is possible to suppress the initial invalid stroke of the brake pedal without the need of a complicated and expensive valve mechanism.

By providing the first and second ports so as to axially overlap with each other, it is possible to shorten the piston stroke until the first ports are closed.

Preferably, the cylinder body has on its inner wall an annular wall supporting a backside of the cup and having an inner diameter greater than the outer diameter of the piston, the piston having on its outer circumference an annular groove communicating with the first ports and positioned so as to radially oppose the annular wall through an annular gap defined therebetween when the piston is in the inoperative position, whereby the pressure chamber is adapted to communicate with the reservoir through the annular gap and the first ports.

With this arrangement, brake fluid can be sucked more smoothly.

Further, since a sufficiently large annular gap is defined between the annular wall and the bottom of the annular groove, brake fluid can be supplied smoothly through this large annular gap without the need to so markedly increase the gap between the annular wall and the outer periphery of the piston and/or the depth of the annular groove. Since it is not necessary to so markedly increase the gap between the annular wall and the outer periphery of the piston in order to smoothly suck brake fluid, the piston is less likely to gall the cup while advancing. Since it is not necessary to form so deep an annular groove, the behavior of the cup while the piston is advancing stabilizes and the strength of the piston is kept high.

Preferably, the second ports have their rear ends aligned with the rear end of the annular groove with respect to a radial direction of the piston. With this arrangement, the position of the piston at which the first ports are closed by the cup stabilizes. Preferably, the second ports have their front ends radially aligned with or positioned axially fowardly of the front end of the annular groove. With this arrangement, the sectional area of the passage through which brake fluid flows can be increased to a maximum by the annular groove.

Preferably, the annular groove has an axial width smaller than the axial width of a portion of the cup in contact with the outer periphery of the piston. This prevents the cup from falling into the annular groove in its entirety. The cup can thus stably perform its sealing function while the piston is moving.

Preferably, the annular groove has front and rear tapered surfaces extending from front and rear edges thereof at acute angles with respect to the outer periphery of the piston. The tapered surfaces serve as chamfers and prevent the cup from getting damaged by the edges of the annular groove.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENTS

Figure 1:
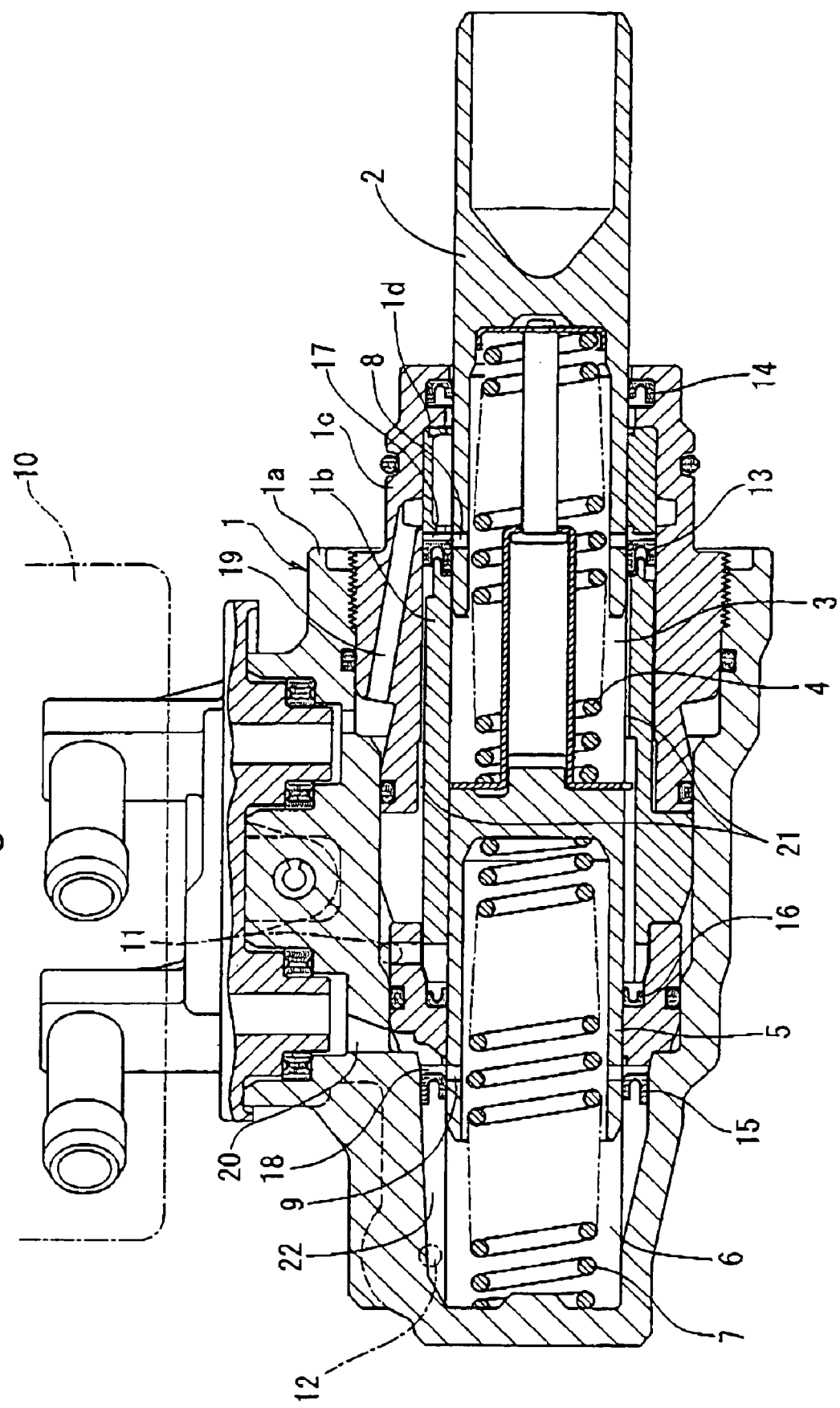
FIG. 1 is a sectional view of a master cylinder of a first embodiment of the present invention.
Figure 2:
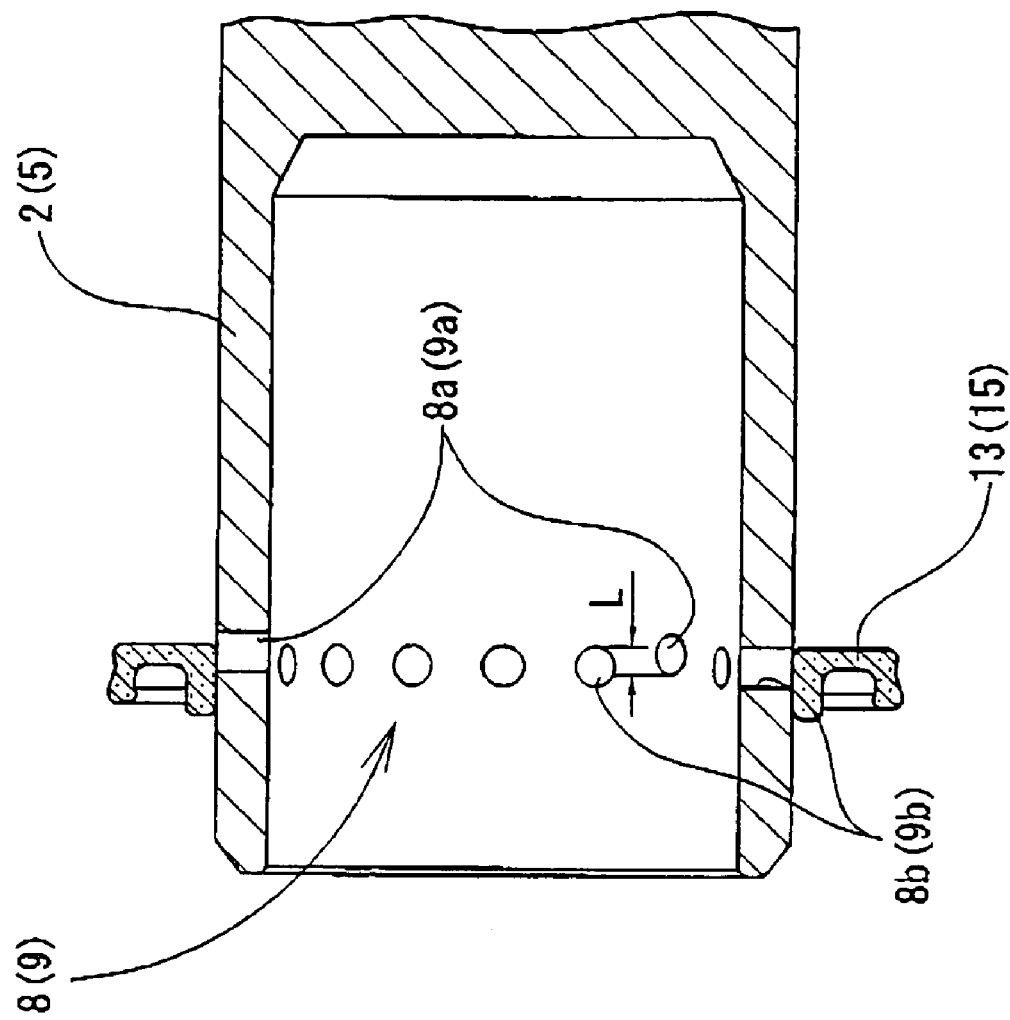
FIG. 2 a partial sectional view of the same, showing piston ports formed in one of the pistons of the master cylinder.

Now referring to the drawings, FIGS. 1 and 2 show the master cylinder of the first embodiment. It basically comprises a cylinder body 1, a primary piston 2 slidably inserted in the cylinder body 1, and a secondary piston 5 slidably inserted in the cylinder body 1 in front (leftwardly in FIG. 1) of the primary piston 2. A first pressure chamber 3 is defined in the cylinder body 1 between the primary and secondary pistons 2 and 5. A return spring 4 for the primary piston 2 is mounted in the pressure chamber 3. A second pressure chamber 6 is defined in the cylinder body 1 between the secondary piston 5 and the front end wall of the cylinder body 1. A return spring 7 for the secondary piston 5 is mounted in the second pressure chamber 6. Brake fluids in the first and second pressure chambers 3 and 6 are pressurized by the primary and secondary pistons 2 and 5, respectively, to produce brake hydraulic pressures. The primary piston 2 and the secondary piston 5 have piston ports 8 and 9, respectively.

In the embodiment, the cylinder body 1 comprises a plurality of separate members (i.e. main portion 1a, sleeve 1b, cover 1c and guide 1d) that are joined together, but it may be a one-piece member if such a one-piece cylinder body poses no problem in manufacturing and assembling.

Primary cups 13 and 15, a secondary cup 14 and a pressure cup 16 are fitted in annular grooves formed in the inner periphery of the cylinder body 1. The primary cup 13 and the secondary cup 14 are in sliding contact with the primary piston 2, the former sealing the outer periphery of the primary piston 2, and the latter serving as a seal between the interior of the cylinder body 1 and the atmosphere. The primary cup 15 and the pressure cup 16 are in sliding contact with the secondary piston 5, the former sealing the outer periphery of the secondary piston 5 and the latter serving as a seal between the first pressure chamber 3 and a reservoir 10.

Passages 17 and 18 are formed behind (on the right-hand side in FIG. 1) of the primary cups 13 and 15, respectively. The passages 17 and 18 are positioned so as to communicate with the piston ports 8 and 9, respectively, while the primary piston 2 and the secondary piston 5 are in their original positions, i.e. while the brake pedal is not being depressed. Thus, in this inoperative state, the first pressure chamber 3 communicates with the reservoir 10 through the piston ports 8, the passage 17, and a passage 19 formed in the cylinder body 1. Similarly, the second pressure chamber 6 communicates with the reservoir 10 through the piston ports 9, the passage 18, and a passage 20 formed in the cylinder body 1.

As shown in FIG. 2, both of the piston ports 8 and 9 comprise two kinds of ports, i.e. first ports 8a (9a) that ensure communication between the respective pressure chamber 3 or 6 and the reservoir 10 while the pistons 2 and 5 are in their original positions, and second ports 8b (9b) through which brake fluid is sucked during automatic brake control.

Preferably, each of the pistons 2 and 5 is formed with one to two first ports 8a (9a) and about 10–14 second ports 8b (9b).

As viewed from a direction perpendicular to the axis of the respective pistons 2 and 5, the second ports 8b (9b) are provided forward of the first ports 8a (9a) with respect to the direction in which the pistons 2 and 5 advance, while overlapping with the first ports 8a (9a) in the axial range indicated by the letter L in FIG. 2.

When the primary piston 2 and the secondly piston 5 are advanced and then quickly returned, the primary cups 13 and 15 are deformed such that their radially outer portions are pulled leftwardly in FIG. 1 under negative pressures produced in the first and second pressure chambers 3 and 6, thus forming gaps between the respective primary cups 13 and 15 and the inner wall of the cylinder body 1. Through these gaps and passages 21 and 22 formed in the cylinder body 1, brake fluid can be smoothly sucked into the respective pressure chambers 3 and 6.

When automatic brake control such as vehicle stability control is activated while the pistons 2 and 5 are in their original positions, brake fluid can be smoothly supplied from the reservoir 10 into the pressure chambers 3 and 6 through the piston ports 8 and 9, and then from the pressure chambers 3 and 6 to hydraulic units through outlet ports 11 and 12. Brake fluid can be supplied reliably into the pressure chambers 3 and 6 because the ports 8a (9a) are provided rearwardly of the ports 8b (9b) and thus reliably in communication with the passages 17 and 18 when the pistons 2 and 5 are in their original positions.

When the brake pedal is depressed, and the primary piston 2 and the secondary piston 5 advance, the second ports 8b (9b), provided forwardly of the first ports 8a (9a), are closed before the first ports 8a (9a) by the primary cups 13 and 15. Since the second ports 8b (9b) are far greater in number and thus sectional area than the first ports 8a (9a), when the second ports are closed, the driver feels that the brakes are working. Thus, the driver can more quickly feel the braking effects.

FIGS. 3–9 show the second embodiment. The master cylinder of this embodiment has a one-piece cylinder body 1 and thus is far simpler in structure than the first embodiment.

Since the second embodiment includes elements that are identical or similar to the elements of the first embodiment, these elements are denoted by identical numerals and their description is omitted.

Primary cups 13 and 15, a secondary cup 14 and a pressure cup 16 are fitted in annular grooves formed in the inner periphery of the cylinder body 1. The primary cup 13 and the secondary cup 14 are in sliding contact with the primary piston 2, the former sealing the outer periphery of the primary piston 2, and the latter serving as a seal between the interior of the cylinder body 1 and the atmosphere. The primary cup 15 and the pressure cup 16 are in sliding contact with the secondary piston 5, the former sealing the outer periphery of the secondary piston 5 and the latter serving as a seal between the first pressure chamber 3 and a reservoir 10.

The primary cups 13 and 15 have their backs (right-hand side in FIG. 3) supported by annular walls 23 and 24 integral with the cylinder body 1.

The annular walls 23 and 24 have an inner diameter greater than the outer diameter of the primary piston 2 and the secondary piston 5 to define gaps between the annular walls 23 and 24 and the primary and secondary pistons 2 and 5.

The primary piston 2 and the secondary piston 5 are formed with annular grooves 28 and 29, respectively, in their outer circumferences which communicate with first and second pressure chambers 3 and 6 through piston ports 8 and 9. The piston ports 8 and 9 are substantially identical in structure to the piston ports 8 and 9 of the first embodiment. That is, they comprise first ports 8a (9a) and second ports 8b (9b) as shown in FIG. 2. But in FIGS. 5–9, only the first ports 8a (9a) are shown.

While the pistons 2 and 5 are in their original (inoperative) positions, the grooves 28 and 29 radially align with the respective annular walls 23 and 24 with annular gaps C defined between the annular walls 23 and 24 and the bottoms of the annular grooves 28 and 29. Naturally, the annular gaps C are greater than gaps present between the annular walls 23 and 24 and the outer peripheral surfaces of the pistons 2 and 5 when the pistons 2 and 5 are not in their original positions.

Figure 5:
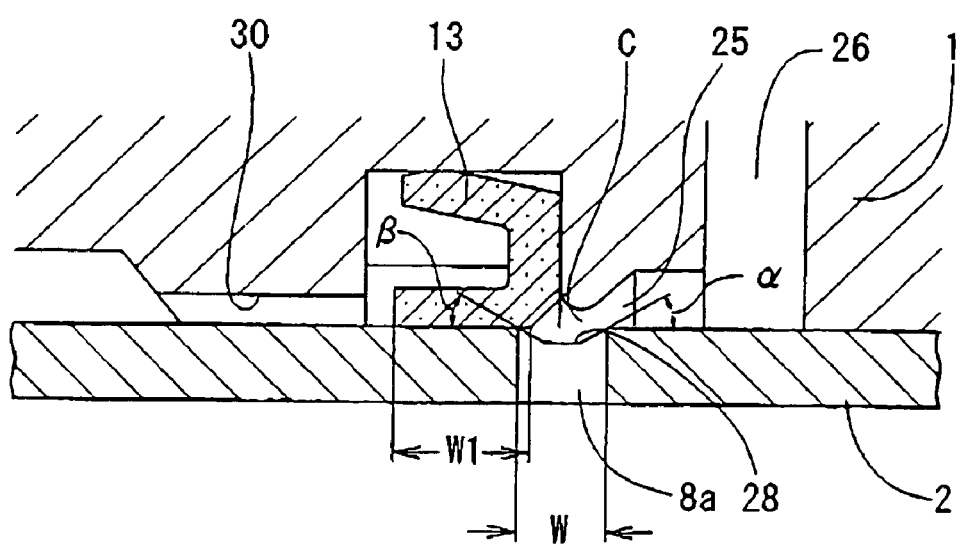
FIG. 5 is an enlarged sectional view of the second embodiment, showing passages formed in and near the primary piston of the master cylinder.

FIG. 5 shows the annular gap C defined between the annular wall 23 and the bottom of the annular groove 28 when the piston 2 is in its original position. While not shown, the annular gap C defined between the annular wall 24 and the bottom of the annular groove 29 is exactly of the same shape as the gap C shown.

Behind (rightward of) the respective annular walls 23 and 24, annular passages 25 and 26 are formed in the cylinder body 1. When it is necessary to supply brake fluid to the first and second pressure chambers 3 and 6 from the reservoir 10 for e.g. automatic braking, brake fluid flows through passages 20, 19 and 27 formed in the cylinder body 1, the annular passages 25 and 26, the annular gaps C, the annular grooves 28 and 29 and the first ports 8a and 9a into the respective pressure chambers 3 and 6.

Figure 6:
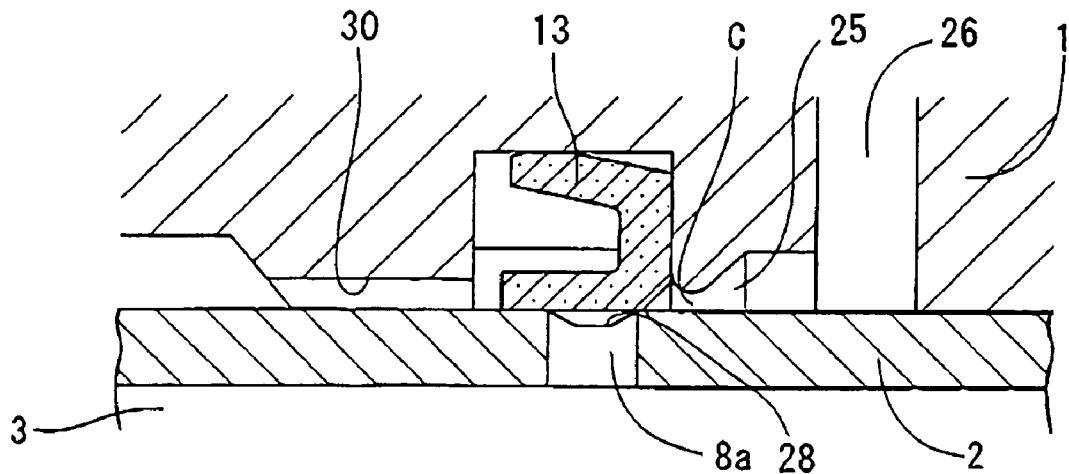
FIG. 6 is a view similar to FIG. 5, with the piston ports completely closed.

As shown in FIG. 6, when the primary piston 2 has advanced until the rear edge of the annular groove 28 coincides with the rear edge of the primary cup 13, the first ports 8a are completely closed (the second ports 8b are also closed), so that the first pressure chamber 3 is shut off from the reservoir 10. Thus, when the primary piston 2 further advances from this position, brake hydraulic pressure is produced in the first pressure chamber 3. Similarly, brake hydraulic pressure is produced in the second pressure chamber 6 in exactly the same manner as above when the secondary piston 5 advances.

Figure 3:
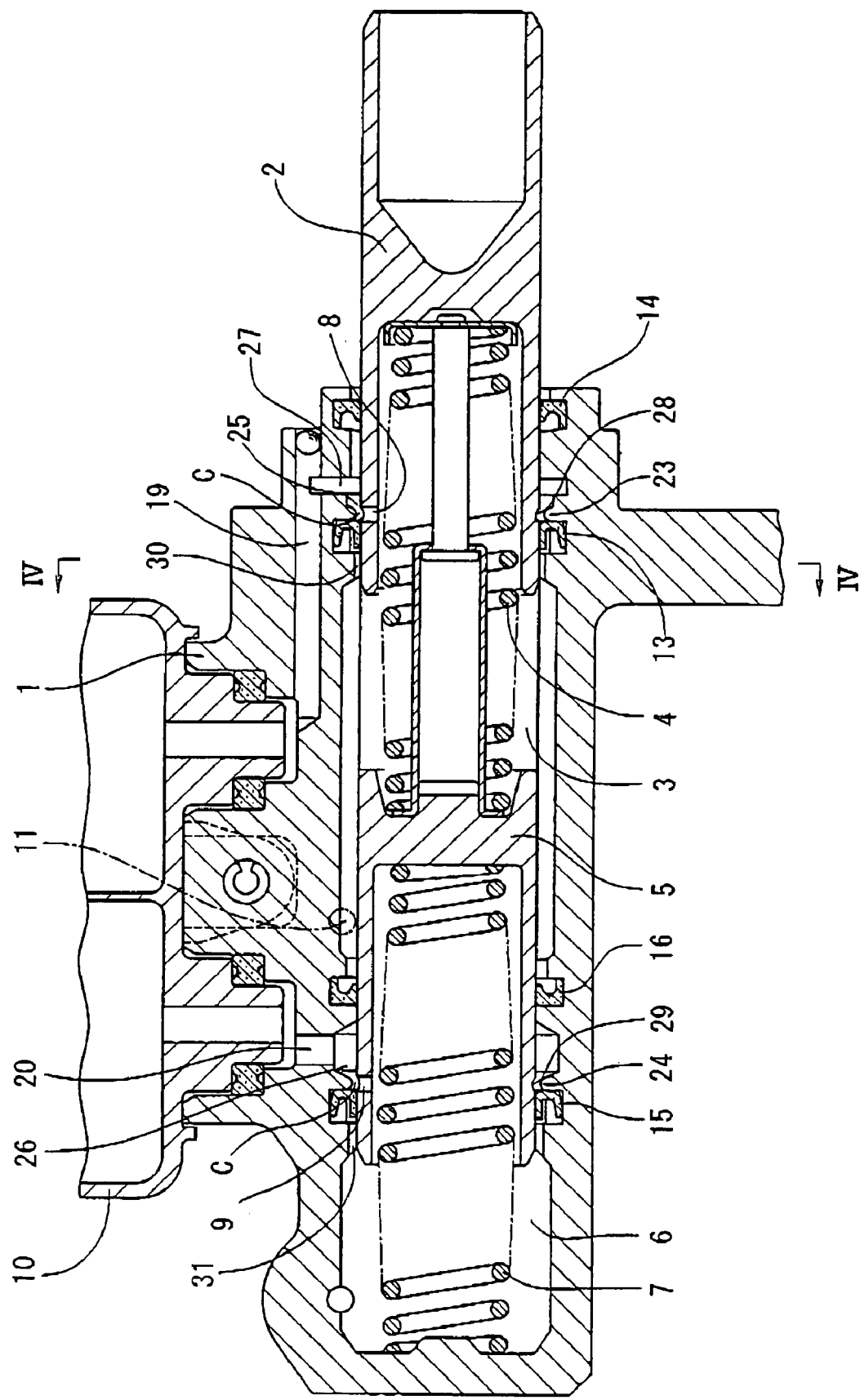
FIG. 3 is a sectional view of a second embodiment of the present invention.
Figure 4:
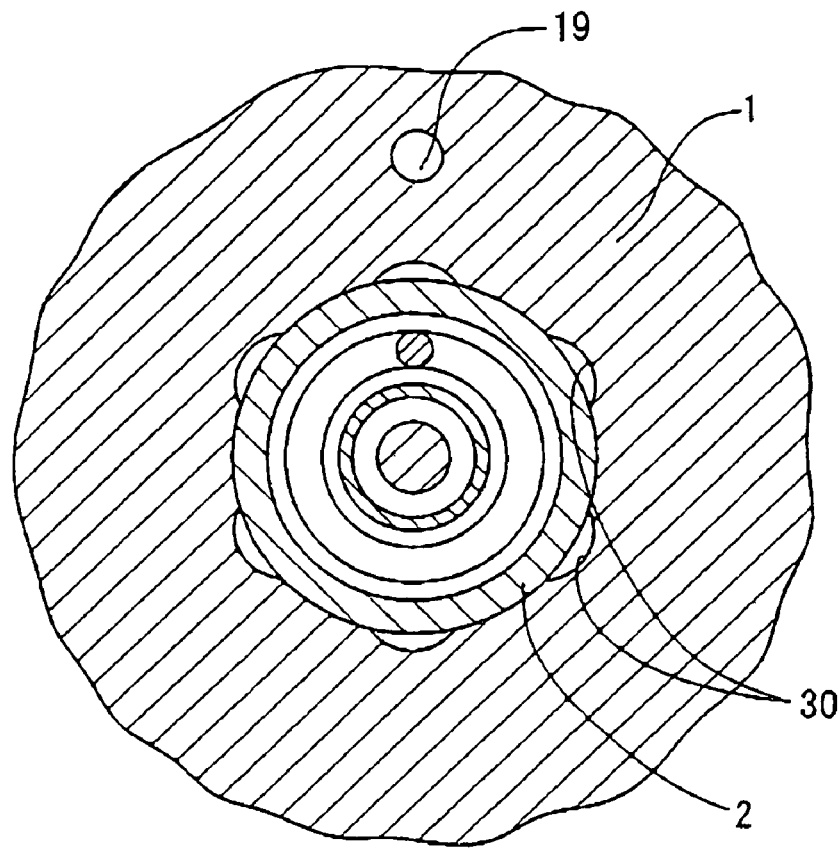
FIG. 4 is a sectional view taken along line IV—IV of FIG. 3.

As shown in FIG. 3, in front of the respective primary cups 13 and 15, grooves 30 and 31 are formed in the inner surface of the cylinder body 1 (along which the pistons 2 and 5 are slidably guided). When the pistons are returned quickly, brake fluid can smoothly flow into the pressure chambers 3 and 6 through the grooves 30 and 31 and gaps formed around the primary cups 13 and 15 as a result of deformation of the cups 13 and 15 due to negative pressures produced in the pressure chambers 3 and 6. FIG. 4 shows cross-sections of the grooves 30. While not shown, the grooves 31 have exactly the same cross-sections as the grooves 30.

In order to prevent the pistons 2 and 5 from inclining relative to the cylinder body 1 and galling the cups and to allow smooth suction of hydraulic fluid into the pressure chambers 3 and 6 while the pistons 2 and are in their original, inoperative positions, the annular gap defined between the annular wall 23 and the outer periphery of the primary piston 2, and the annular gap defined between the annular wall 24 and the outer periphery of the secondary piston 5 preferably have a radial width of about 0.1–0.3 mm. The depth of the annular grooves 28 and 29 (i.e. half of the difference in diameter between the outer peripheries of the pistons and the bottoms of the grooves 28 and 29) is determined according to the required size of the annular grooves C. But if the pistons have a reduced wall thickness for compactness and/or lightness in weight, the annular grooves 28 and 29 preferably have a depth of about 0.1–0.3 mm.

Figure 7:
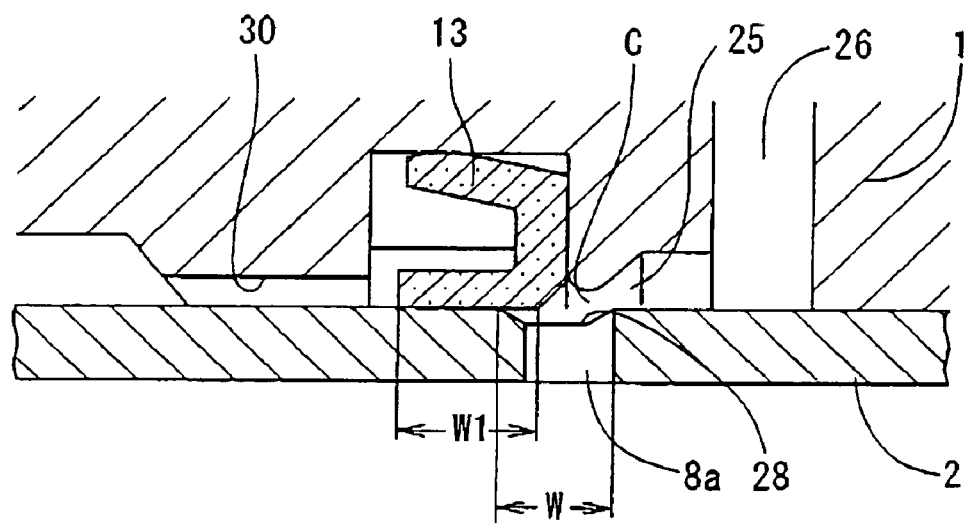
FIG. 7 is a similar view of a different arrangement in which the annular groove has its front end disposed forwardly of the front end of the ports for ensuring communication.

The annular grooves 28 and 29 may have their rear ends axially displaced from the rear ends of the corresponding first ports 8a and 9a to a certain extent. But preferably, the annular grooves 28 and 29 have their rear ends aligned with the rear ends of the first and second ports 8a and 9a in a radial direction of the pistons 2 and 5. The annular grooves 28 and 29 may have their front ends radially aligned with or, as shown in FIG. 7, axially displaced from the front ends of the first ports 8a and 9a. In order to maintain stable sealing properties of the primary cups 13 and 15, the annular grooves 28 and 29 preferably have an axial width W (FIGS. 5 and 7) smaller than the axial width W1 of the portions of the cups 13 and 15 that are in contact with the pistons.

Figure 8:
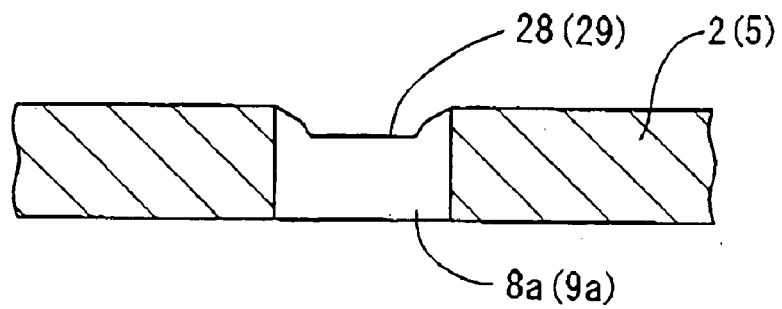
FIGS. 8 and 9 are partial sectional views of a piston of the master cylinder formed with different piston ports for ensuring communication.
Figure 9:
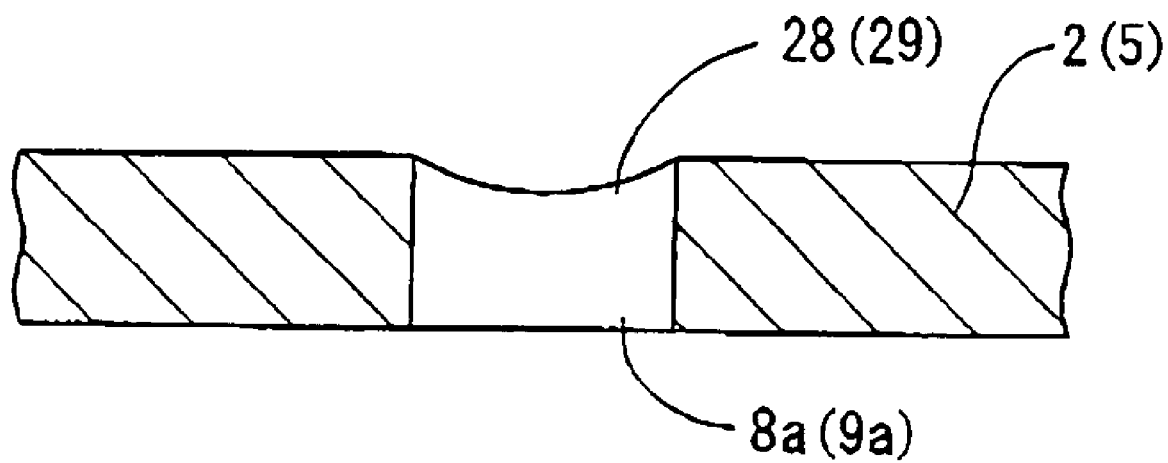

Preferably, the annular grooves 28 and 29 have front and rear tapered surfaces extending from the front and rear edges thereof at acute angles $\alpha$ and $\beta$ (FIG. 5) with respect to the outer periphery of the pistons 3 and 5. The tapered surfaces serve as chamfers and protect the primary cups. For the same purpose, instead of forming the tapered surfaces, the annular grooves 28 and 29 may have an arcuate axial section as shown in FIG. 9. But the annular grooves 28 and 29 having the front and rear tapered surfaces have a greater sectional area. As shown in FIG. 8, the front and rear tapered surfaces may have steps.

The concept of the invention is applicable not only to a tandem master cylinder as described above but to a single-piston master cylinder.

What is claimed is:

1. A master cylinder comprising a cylinder body, a cup supported on an inner wall of said cylinder body, and a piston inserted in said cylinder body so as to be in sliding contact with a radially inner periphery of said cup, said piston defining a pressure chamber in said cylinder body, and being formed with piston ports through which said pressure chamber is adapted to communicate with a reservoir while said piston is in an inoperative position, said piston ports comprising first ports for ensuring communication between said pressure chamber and said reservoir, and second ports through which brake fluid in said reservoir is sucked into said pressure chamber during automatic brake control, said second ports being greater in number than said first ports and being provided forwardly of said first ports with respect to a direction in which said piston advances, wherein said first ports overlap with said second ports as viewed from a direction perpendicular to an axis of said piston.

2. The master cylinder of claim 1 wherein there are provided 1 to 2 of said first ports and 10–14 of said second ports.

3. The master cylinder of claim 1 wherein said cylinder body has on its inner wall an annular wall supporting a backside of said cup and having an inner diameter greater than the outer diameter of said piston, said piston having on its outer circumference an annular groove communicating with said first ports and positioned so as to radially oppose said annular wall through an annular gap defined therebetween when said piston is in said inoperative position, whereby said pressure chamber is adapted to communicate with said reservoir through said annular gap and said first ports.

4. The master cylinder of claim 3 wherein said second ports have their rear ends aligned with the rear end of said annular groove with respect to a radial direction of said piston, and have their front ends radially aligned with or positioned axially forwardly of the front end of said annular groove.

5. The mast cylinder of claim 3 wherein said annular groove has an axial width smaller than the axial width of a portion of said cup in contact with the outer periphery of said piston.

6. The master cylinder of claim 3 wherein said annular groove has front and rear tapered surfaces extending from front and rear edges thereof at acute angles with respect to the outer periphery of said piston.

7. The master cylinder of claim 1 wherein there are provided 1 to 2 of said first ports and 10–14 of said second ports.

* * * * *